United States Patent
Geusz et al.

(10) Patent No.: US 10,855,674 B1
(45) Date of Patent: Dec. 1, 2020

(54) PRE-BOOT NETWORK-BASED AUTHENTICATION

(71) Applicant: MicroStrategy Incorporated, Vienna, VA (US)

(72) Inventors: Darrell Geusz, Sterling, VA (US); Michael W. Morrow, Washington, DC (US); Loic Fabro, Herndon, VA (US)

(73) Assignee: MicroStrategy Incorporated, Vienna, VA (US)

( * ) Notice: Subject to any disclaimer, the term of this patent is extended or adjusted under 35 U.S.C. 154(b) by 259 days.

(21) Appl. No.: 15/975,960

(22) Filed: May 10, 2018

(51) Int. Cl.
*G06F 21/57* (2013.01)
*H04L 29/06* (2006.01)

(52) U.S. Cl.
CPC ........ *H04L 63/0823* (2013.01); *G06F 21/575* (2013.01); *H04L 63/0272* (2013.01); *H04L 63/083* (2013.01); *H04L 63/0861* (2013.01); *H04L 63/20* (2013.01); *G06F 2221/034* (2013.01)

(58) Field of Classification Search
CPC ...... G06F 21/57; G06F 21/572; G06F 21/575; G06F 21/62; G06F 21/6209; G06F 21/6218; G06F 21/629; G06F 2221/034; H04L 63/0823; H04L 63/0272; H04L 63/083; H04L 63/0861; H04L 63/10; H04L 63/20
See application file for complete search history.

(56) References Cited

U.S. PATENT DOCUMENTS

| 6,314,520 | B1 * | 11/2001 | Schell | G06F 21/82 |
| | | | | 726/13 |
| 8,260,891 | B2 | 9/2012 | Abels et al. | |
| 9,906,493 | B1 * | 2/2018 | Rodgers | H04L 63/0281 |
| 2001/0052069 | A1 * | 12/2001 | Sekiguchi | G06F 9/4416 |
| | | | | 713/2 |

(Continued)

FOREIGN PATENT DOCUMENTS

JP 2010073193 4/2010

OTHER PUBLICATIONS

Application Notes: Pre-Boot Authentication AN-5, Marx Software Security, dated Dec. 2014, 8 pages.

(Continued)

*Primary Examiner* — Malcolm Cribbs
(74) *Attorney, Agent, or Firm* — Fish & Richardson P.C.

(57) ABSTRACT

Methods, systems, and apparatus, including computer programs encoded on a computer-readable storage medium, for pre-boot network-based authentication. In some implementations, a computing device enters a UEFI environment upon powering on the computing device. While in the UEFI environment, the computing device restricts booting of an operating system of the computing device, accesses a signed certificate corresponding to a particular user, sends a verification request to a server system over a communication network, and receives a verification response from the server system over the communication network. In response to receiving the verification response, the computing device (i) enables the operating system to boot and (ii) verifies the (Continued)

identity of the particular user to the operating system such that the operating system logs in the particular user without requiring further proof of identity for the particular user.

20 Claims, 5 Drawing Sheets

(56) References Cited

U.S. PATENT DOCUMENTS

| | | | |
|---|---|---|---|
| 2005/0120202 A1* | 6/2005 | Cuellar | H04L 63/0823 713/156 |
| 2005/0125691 A1* | 6/2005 | Garg | H04L 63/02 726/4 |
| 2006/0129797 A1 | 6/2006 | Durfee et al. | |
| 2008/0229433 A1* | 9/2008 | Chen | G06F 21/575 726/35 |
| 2009/0138876 A1* | 5/2009 | Chang | G06F 8/60 717/176 |
| 2009/0319806 A1 | 12/2009 | Smith et al. | |
| 2009/0327741 A1* | 12/2009 | Zimmer | H04W 12/1006 713/183 |
| 2010/0083002 A1 | 4/2010 | Cui et al. | |
| 2011/0138166 A1 | 6/2011 | Peszek et al. | |
| 2011/0321132 A1* | 12/2011 | Slingerland | H04N 21/4788 726/4 |
| 2012/0179904 A1* | 7/2012 | Dunn | G06F 21/575 713/155 |
| 2013/0013755 A1* | 1/2013 | Huang | H04L 12/4641 709/222 |
| 2014/0108784 A1* | 4/2014 | Pendarakis | H04L 63/062 713/156 |
| 2014/0181494 A1* | 6/2014 | Kayama | G06F 21/575 713/2 |
| 2014/0325234 A1* | 10/2014 | Shiyafetdinov | H04L 9/0819 713/182 |
| 2015/0121497 A1* | 4/2015 | Brossard | H04L 63/0869 726/7 |
| 2015/0143508 A1* | 5/2015 | Halibard | G06F 9/24 726/18 |
| 2015/0200934 A1* | 7/2015 | Naguib | G06F 21/575 713/2 |
| 2015/0220742 A1* | 8/2015 | Ouyang | G06F 21/602 713/189 |
| 2015/0379308 A1* | 12/2015 | Nakano | G06F 21/50 726/36 |
| 2017/0185530 A1* | 6/2017 | Wada | G06F 21/53 |
| 2017/0187703 A1* | 6/2017 | Enrique Salpico | G06F 21/44 |
| 2017/0244698 A1* | 8/2017 | Gale | H04L 63/061 |
| 2019/0005244 A1* | 1/2019 | Brasher | G06F 12/1408 |
| 2019/0121647 A1* | 4/2019 | Por | G06F 11/3051 |

OTHER PUBLICATIONS

Yao et al., "A Tour Beyond BIOS Implementing UEFI Authenticated Variables in SMM with EDKII," Intel, dated Sep. 2015, 39 pages.

Davis, "UEFI Security Enhancements," insyde, dated Oct. 2011, 21 pages.

* cited by examiner

PRE-BOOT NETWORK-BASED AUTHENTICATION

TECHNICAL FIELD

This specification generally relates to authentication systems for electronic devices.

BACKGROUND

Many devices require authentication of a user before access is granted. For example, computers or phones may require a user to enter a password or code to obtain access.

SUMMARY

In some implementations, a computing system can use network-based authentication to verify a user's identity before booting an operating system (OS). The computing device can implement pre-boot access control, managed by the firmware of the computing device that requires a server to verify the identity and/or authorization of a user before passing control to software upon powering on the computing system. For example, booting of the OS can be restricted until the network-based authentication process is successfully completed. When the computing system is powered on, the computing system can establish a network connection and authenticate with a server while in a Unified Extensible Firmware Interface (UEFI) or similar environment. After authenticating with the server, the computing system can perform a hand-off to an operating system and a single-sign-on (SSO) agent. The handoff could be carried out so that, after the UEFI authentication, the user could be automatically logged in to the OS and potentially other resources without requiring any user input. For example, authentication information from the UEFI environment can be passed to the OS and SSO agent so that the user does not need to enter a password to log in to the OS. As another example, a virtual private network (VPN) connection can be established while in the UEFI environment and maintained through the OS boot process. The SSO agent can then sign the user in to local applications, network resources, web sites, and so on, based on the original network-based authentication carried out in the UEFI environment.

Network-based verification can use a signed certificate and associated private key stored in a trusted platform module (TPM) of the computing device. Verification of the certificate can be used to enable proof of a user's identity within the UEFI environment of the computing device prior to booting the OS. Once the certificate is determined to be valid and not expired, the computing device allows the OS to boot, and identity verification data stored within the TPM can be used to automatically log the user into the OS without requiring any user input. Thus, the techniques discussed herein allow a computing device to verify the identity and authorization of a user at a very early stage (e.g., under firmware control such as in the UEFI environment), before passing control to software such as the OS. The techniques can also securely log a user into an OS without requiring the user to manually provide proof of his/her identity after the UEFI verification.

The architecture of the system provides various advantages relating to certificate verification and/or user authentication. As an example, performing verification in the UEFI environment provides more secure access control and resistance to software vulnerabilities. Secure network connections, such as VPNs, can be established in the UEFI environment and maintained through the transition to software control (e.g., OS boot). As another example, authentication over a network-based connection with a server allows the system to take into account up-to-date changes to a user's authorizations, changes to the security policies, and/or changes to the validity of certificates. For example, if a user's permissions or authorization changes, such as if the user's credential is revoked, the server will have a record of the current status and can block access. The server or the firmware can also enforce any restrictions or policies associated with the user's credential, e.g., to limit the days, times, locations, authentication modalities, or transaction types, for each transaction using the current policies that apply.

In some implementations, security is enhanced using secondary authentication checks, in addition to certification verification, to verify that the identity of the individual attempting to access the computing device. For instance, after a valid certificate is used as proof of identity, a user may be requested to provide a pre-enrolled personal identifier number (PIN) to further verify his/her user identity. In this regard, techniques discussed herein can enable a computing device to improve user accessibility when authenticating a user into a secure OS session while also maintaining security in preventing fraudulent attempts to access the computing device.

In some implementations, a computer-implemented method can be executed by a computing device. A computing device enters a Unified Extensible Firmware Interface (UEFI) environment upon powering on the computing device. While in the UEFI environment, the computing device performs a set of operations. The computing device restricts booting of an operating system of the computing device. The computing device accesses a (signed) certificate corresponding to a particular user from a trusted platform module of the computing device. The computing device sends a verification request to a server system over a communication network with the verification request being generated based on the (signed) certificate. The computing device then receives a verification response from the server system over the communication network with the verification response confirming authorization for the particular user corresponding to the (signed) certificate. In response to receiving the verification response, the computing device (i) enables the operating system to boot and (ii) provides identity verification data for the particular user to the operating system such that the operating system logs in the particular user without requiring further proof of identity for the particular user.

One or more implementations can include the following optional features. For example, in some implementations, the trusted platform module stores a secure address for the server system. In such implementations, sending the verification request to the server system includes determining an address to send the verification request based on the secure address stored in the trusted platform module, and sending the verification request to the secure address for the server system.

In some implementations, while in the UEFI environment, the method further includes: entering a virtual private network session based on the verification response confirming authorization for the particular user corresponding to the (signed) certificate data, and passing the virtual private network session to the operating system such that the operating system continues the virtual private network session after the operating system is enabled to boot.

In some implementations, the method further includes receiving, by the computing device, a proof of identity of the particular user, verifying the proof of identity of the particular user, and enabling the operating system to boot based on verifying the proof of identity of the particular user.

In some implementations, verifying the proof of identity of the particular user comprises verifying at least one of: a personal identification number (PIN) provided by the particular user, a username and password combination provided by the particular user, biometric data of the particular user, or proximity of one or more trusted devices of the particular user.

In some implementations, the verification response indicates that (i) an authorization issued to a user is valid and has not expired, and (ii) use of the authorization is not presently restricted by an authorization policy.

In some implementations, the authentication policy specifies a particular time frame during which use of the authorization is restricted.

In some implementations, the method further includes obtaining, by the computing device, context data associated with the computing device upon powering on the computing device. In such implementations, the verification response confirms that the context data associated with the computing device satisfies the authorization policy.

In some implementations, while in the UEFI environment, the method further includes determining, by the computing device, that the computing device is unable to connect to the communication network, and in response to determining that the computing device is unable to connect to the communication network, accessing by the computing device and from the trusted platform module, a limited certificate corresponding to the particular user. In such implementations, the method further includes enabling, by the computing system, the operating system to boot in a limited configuration such that the operating system restricts network access on the computing device after the operating system logs in the particular user.

In some implementations, the method further includes after enabling the operating system to boot in the limited configuration, providing, by the computing device, identify verification data specifying the limited certificate to one or more applications running on the operating system such that the one or more applications logs in the particular user without requiring proof of identity.

In some implementations, the verification request includes at least a device identifier of the computing device stored within the trusted platform module and a user identifier for with the particular user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, systems and techniques are described for providing pre-boot authentication and device access control. Verification of a user's identity and authorization to access a device can be performed in a UEFI environment of the computing device with communication over a network. Once verified, booting of an operating system is permitted and the UEFI-managed authentication of the user is extended to log the user into the operating system without requiring any further proof of identity. Verification of user identity and authorization can be based on a signed certificate that is remotely verified by a server system over a communication network so that remotely-updated policies and authorization changes can be used to dynamically control the user's access the computing device. For example, the access control policies can specify time restrictions during which the signed certificate is not verified to provide device access, location restrictions where the signed certificate is not verified to provide device access, among others. In this regard, remote certificate verification prior to operating system boot on a computing device provides a greater degree of security and control over access to the computing device.

Figure 1A:
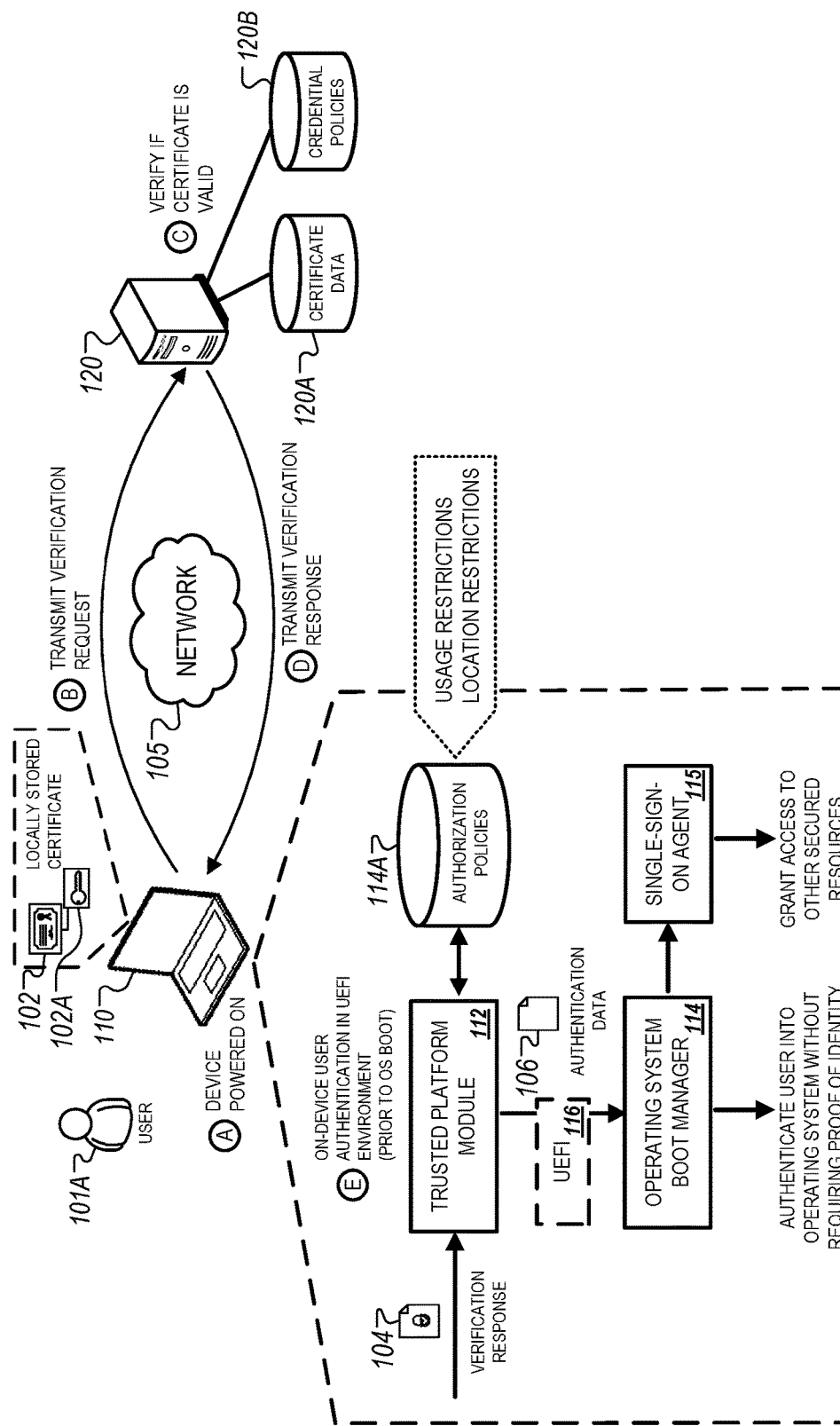
FIGS. 1A-1B are block diagrams that illustrate example systems for pre-boot network-based authentication.

FIG. 1A is a block diagram that illustrates an example of a system 100 for pre-boot network-based authentication. The system 100 includes a computing device 110, a network 105, and a server 120. The example of FIG. 1A illustrates access control enforced in the UEFI environment 116 of the computing device 110. The access control limits access to the computing device 110 until authentication of a user 101 is performed through communication with the server 120 over the network 105. This authentication can involve verifying a signed certificate 102 while the computing device 110 remains in a UEFI environment 116, prior to booting an OS of a computing device 110. In this example, the signed certificate 102 is used as proof of identity for a user 101, and successful authentication is then used to automatically log the user 101 into the OS without requiring the user to submit his/her OS login credentials. In addition to showing elements of the system 100, FIG. 1A illustrates a flow of data as stages (A) to (E).

In the example depicted in FIG. 1A, the user 101 is an employee of a company and the computing device 110 is a company-issued device to be used in the scope of employment of the user 101. The certificate 102 is a certificate that has previously been issued to the user 101 and locally stored on the computing device 110 prior the computing device 110 being powered on. For example, the certificate 102 can be a certificate that was issued during an initial certificate provisioning procedure with an example implementation depicted in FIG. 2, or alternatively, during a prior user session on the computing device 110. The certificate 102 represents authorizations of the user 101, such as permission and/or access levels for performing actions on the computing device 110. For example, the authorizations can specify whether the user 101 can access the computing device 110, the applications that can be used by the user 101, or conditions associated with accessing the computing device 110.

Although the descriptions below refer to the certificate 102 as being issued by an employer to an employee, the descriptions below can also be applied to other contexts where users are provided authorizations to perform certain secure operations. For example, the certificate 102 can represent authorization or proof of identity granted by, for example, a government entity, a financial institution, or another party. The User 101 can represent, for example, consumers, contractors, business partners, or another user profile.

In general, a certificate can include data, such as a private key that can be used as proof of identity of a user and/or authorization granted to a user. The certificate usually corresponds to a single specific user, and may additionally or alternatively correspond to a specific credential and/or device associated with the user. In many cases, the certificate is issued or signed based on the authority of a certificate granting authority. For example, a certificate can be a token that proves that the certificate granting authority has issued a particular credential to a user. Possession of the certificate and private key may represent proof of both identity and authorization, in a similar manner that a driver's license can establish identity and authorization to drive.

The certificate may correspond to a credential or authorization that is not issued specifically for access to the computing device 110. For example, rather than represent a user account used specifically to log in to the computing device 110, the certificate may represent an employee badge, a driver's license, a security access level in an organization, a level of education or training achieved, an online account, or other credential. As discussed with respect to FIG. 2, the process of configuring the computing device 110 may designate the possession of a certain credential as a requirement for access, independent of the user account or log in information needed to log into the operating system of the computing device 110. In some instances, a certificate can be used as a proof of the user's authorization to perform certain actions, for example, accessing an operating system of the computing device.

The validity of a certificate can change over time. For example, the certificate may expire and be replaced from time to time, so that the certificate data that represents a credential may be replaced with different certificate data that represents the same credential. Even if the certificate remains a valid representation of a credential, the authorization or validity of the underlying credential that the certificate represents may be altered. For example, a certificate may be data that represents a person's credential as an employee of an organization. The authorization of the employee credential may vary, for example, if the person changes departments or terminates employment. As a result, although a certificate may provide proof of a user's identify and the identification of a credential issued to a user, the certificate may not be effective to grant access if the underlying credential or access authorization has been revoked.

In the system 100, the computing device 110 can be, for example, a laptop computer, a desktop computer, a tablet computer, a phone, a smartphone, a navigation device, a wearable computing device, etc. The computing device 110 is configured to directly enter a hardware- or firmware-controlled environment when powered on. For example, this controlled environment may be the UEFI environment 116.

The UEFI environment 116 defines an interface between the firmware and OS of the computing device 110. The UEFI environment 116 can be used as a replacement to, or in conjunction with, the Basic Input/Output System (BIOS) firmware used by computing devices. For example, the UEFI environment 116 can allow the computing device 110 to provide a secure boot function. The secure boot function can protect the computing device 110 from malware by only allowing authorized boot loaders to run when the computing device 110 is turned on. The secure boot function can establish a Virtual Private Network or other communications tunnel in order to communicate securely with the server 120. The secure boot function can execute related Machine Learning or Artificial Intelligence algorithms, with or without the server 120. In addition, the secure boot function can prevent access by unauthorized users. Further, by enforcing access policies in cooperation with the server 120, the secure boot function can prevent access by authorized users that would violate the applicable policies.

The computing device 110 includes components, such as a trusted platform module (TPM) 112 and an OS boot manager 114, which operate in conjunction to enable the computing device 110 to provide pre-boot server-based user authentication as depicted in FIG. 1A. The computing device 110 also includes a single-sign-on agent 115, which is a software agent that can be run in the OS environment to manage access to local network resources, web resources, secured local applications, and so on. The TPM 112 can be a dedicated microcontroller that operates in the UEFI environment 116 of the computing device 110. The TPM 112 can provide security-related functions for the computing device 110, such as the creation, verification or secure storage of programming code profiles or templates, hashes, identity attributes, usernames and passwords, personal identification numbers (PINs), access tokens, certificates, and/or encryption keys. The TPM 112 can be installed onto the mainboard of the computing device 110 by the original equipment manufacturer (OEM) of the computing device 110. The TPM 112 can be a discrete component of the mainboard of the computing device 110, or alternatively, implemented as a firmware-based solution on the computing device 110. The TPM 112 can store secure data, such as identity verification data associated with a verified user identity of the user 101, and can unseal and/or decrypt the secure data when needed, e.g., when providing identity verification data for use in authentication.

The OS boot manager 114 can be software that is loaded from a volume boot code that starts the OS that runs on the computing device 110. For example, the OS boot manager 114 can run executable code that a system loader uses to initiate and continue an OS boot process. The single-sign-on agent 115 can be loaded along with the OS, for example, during or after the OS boot process. In some implementations, the UEFI environment 116 may instruct the OS boot manager 114 to load the single-sign-on agent 115 and provide it information about an authenticated session. The single-sign-on agent 115, when active, can extend the authentication of the UEFI environment 116 and/or OS to automatically sign the user in to other resources.

The server 120 can be a server system associated with a certificate granting authority that issues the certificate 102. The server 120 may represent one or more different computers, which may be distributed computing platform (e.g., in a cloud-computing environment). For example, the server 120 can be a credential management server that manages the authentication and the enforcement of credential policies for one or more organizations. The server 120 or another authority may manage issuance of credentials and setting of permissions and authorization provided by the credentials.

In the example depicted in FIG. 1A, the server 120 is associated with an employer of the user 101. The authorization of the user, as an employee, is referred to as the employee credential. The certificate 102 is a digital representation of this credential. During a previous configuration phase, the employee credential of the specific user 101 was designated as a credential that authorizes access to the specific computing device 110 issued to the user 101. As part of the configuration, a certificate representing the user credential was generated and stored in secure storage of the computing device 110, such as in the TPM module 112. The server 120 stores certificate data 120A that can be used to verify the validity of certificates. For example, the certificate data 120A can specify key validation attributes for valid certificates, time points when certificates are issued, validity periods for issued certificates, expiration times for issued certificates, security policies associated with validation procedures for issued certificates, and/or conditions for modifying existing certificates or issuing new certificates. The server 120 can also store credential data that identifies users and the credentials issued to them, as well as the current status of the credentials (e.g., valid, revoked, etc.), and any policies that may limit the use of the credentials and associated certificates.

In the example depicted in FIG. 1A, the illustrated certificate verification technique is executed in a UEFI environment 116 prior to booting the OS on the computing device 110. Thus, the illustrated technique can be performed prior to OS boot and without any dependence on the OS. At step (A), the user 101 powers on the computing device 110. At step (B), the computing device 110 transmits a verification request to a server 120. The verification request is generated using the stored certificate 102 and private key 102A. At step (C), the server 120 verifies that the certificate 102 is valid based on certificate data 120A and corresponds to an authorized user of the computing device 110. At step (D), the server 120 transmits a verification response to the computing device 110. If the certificate 102 is determined by the server 120 to be valid, not expired, and sufficient to prove obtain access, the user 101 is authenticated and verification result provides data granting access. At step (E), in response to the successful verification result, the computing device 110 boot the OS of the computing device 110. The server-based authentication can therefore be used to automatically log the user 101 into the OS and/or other resources without requiring the user to submit any additional proof of identity.

In more detail, the user 101 initially powers on the computing device 110 at step (A). The computing device 110 can be pre-configured to store a signed certificate 102 before the computing device 110 is given to the user 101. For example, as discussed below in reference to FIG. 2, the computing device 110 can be configured to store user identification data for the user 101 and an initially provisioned certificate within the TPM 112. Once the user 101 powers on the computing device 110 for the first time, computing device 110 can be issued a new signed certificate for verification in subsequent user sessions. For example, if an initially-provisioned signed certificate has become invalid or expired during a user session, the server 120 can issue a new signed certificate that then replaces the initially provisioned signed certificate within the TPM 112. The newly signed certificate can then be verified during the next time that the computing device 110 is powered on.

At step (B), the computing device 110 transmits a verification request to a server 120 over the network 105. While in the UEFI environment 116, the computing device 110 establishes a connection with the network 105, e.g., over a wired Ethernet interface, a Wi-Fi interface, a cellular interface, a Virtual Private Network (VPN) or other network connection interface. A network connectivity module of the UEFI environment 116 can be used to establish a connection to the server 120 over the network 105. The computing device 110 can identify a server address to transmit the verification request based on a secure address for the server 120 that is stored within the TPM 112. Thus, the configuration of the computing device 110 can limit communication for verification requests to a particular server or address. The computing device 110 transmits the verification request to the secure address for the server 120 over the network 105.

The verification request can be based on the certificate 102 and private key 102A and the user identification data stored in the TPM 112. For example, the verification request can include some or all of the certificate 102, potentially in an encrypted form. Other information may include key validation attributes of the certificate 102, a device identifier of the computing device 110, and/or a user identifier of the user 101. The information included within the verification request is used by the server 120 to verify that the computing device possesses the signed certificate 102.

In some implementations, the signed certificate 102 and private key 102A can be used as a key to sign or encrypt the verification request or other data. The server 120 may subsequently determine whether the encrypted data or signature was generated using the signed certificate 102. This can allow the server 120 to verify the possession of the signed certificate 102 by the computing device 110 without requiring the computing device 110 to transmit the signed certificate 102.

In some implementations, before sending the verification request, the computing device 110 may perform one or more user identity verification steps. For example, the computing device 110 may request and receive input of a password, a personal identification number (PIN), fingerprint scan data, iris scan data, retina scan data, face scan data, voice data, or other information that establishes the identity of the user 101. The computing device 110 may compare this received information with reference data, securely stored by the TPM 112, that represents trusted data describing the user's password, PIN, fingerprint, iris, retina, face characteristics or voice. The computing device 110 may use this comparison to verify the user is present, before the computing device 110 will send a verification request based on the signed certificate 102. As another example, the computing device may detect, through Bluetooth or another wireless communication channel, that another device that serves as an authentication token for the user 101, such as the user's phone or smart watch, is within a predetermined level of proximity of the computing device 110. The presence of this authentication token may serve as sufficient evidence of a user's identity to enable the computing device 110 to generate and send the verification request.

Depending on the implementation and the policies for the user's credential and for the computing device 110, various aspects of physical context of the computing device 110 may be monitored and checked against predetermined requirements. For example, a GPS location could be determined and compared to a reference area (e.g., a geofence) by the computing device 110. The authentication process may continue only if the current location is within an authorized area. Other context information may indicate a state of the computing device 110, such as whether any other devices are connected, the orientation and motion of the computing device 110, identifiers for any other devices detected nearby, information captured by sensors of the computing device, etc. In some implementations, context information for the computing device 110 and/or biometric information or other user inputs may be captured by the computing device 110 and sent to the server 120 for evaluation and verification in step (C) instead of the processing be performed at the computing device 110.

In some implementations, historical access behavior of the user 101 and location information for the computing device 110 and/or other computing devices provisioned to the user 101 can be captured by the computing device 110 and processed using machine learning and/or artificial intelligence techniques that run in the UEFI environment 116 or on the server 120. In such implementations, the processing of the historical access behavior and/or location information for the computing device 110 can be used to determine or evaluate the access rights of the user 101 and/or verify requirements for the current or future transactions.

At step (C), the server 120 verifies that the computing device 110 possesses the signed certificate 102, using the certificate data 120A. The certificate data 120A can include certificates issued by the certificate issuing authority, and/or other information to verify that certificates are valid. The certificate data 120A can include data that maps different certificates to user identities, user credentials, and the authorizations that the credentials provide. The server 120 can look up a certificate record by device identifier, user identifier, or other identifier associated with the verification request, and determine whether the evidence of possession of the certificate 102 in the request matches any certificates or credentials authorizing access to the computing device 110. The certificate data 120A can also include verification policies specified by the certificate granting authority, time points when certificates were issued, expiration times for issued certificates, a validation status for each of the issued certificates, and/or conditions for determining whether an issued certificate is valid or invalid.

The certificate data 120A can also include metadata of valid and invalid certificates, which are compared against metadata of the certificate 102 to determine if the certificate 102 is valid and unexpired. For example, if metadata of the certificate 102 matches the metadata for an invalid certificate within the certificate data 120A, the server 120 can determine that the certificate 102 is invalid. In another example, if the private key 102A that is associated with the public key of the certificate 102 is identified as being invalid in the certificate data 120A, the server 120 can similarly determine that the certificate 102 is invalid. In some instances, the certificate data 120A can reflect changes to security policies of the certificate granting authority that impact and/or change the validity and/or expiration of issued certificates. In such instances, if the certificate data 120A is associated with a previous security policy that has been changed in the certificate data 120A, then the server 120 can determine that the certificate 102 is invalid and/or expired.

When the server 120 verifies that the verification request demonstrates possession of an appropriate credential for accessing the computing device 110, e.g., through verification of the use of the certificate 102 and the private key 102A in generating the verification request, the server 120 also verifies whether the credential corresponding to the certificate 102 is valid. For example, if the credential is an employee credential, the server 120 can determine whether the employee credential has been deactivated or revoked. The server 120 can also identify any policies that limit use of the credential and determine whether providing access to the credential would satisfy the requirements of the policies. For example, some credentials may be limited to use in certain geographical areas, or at certain times, or subject to other restrictions. If these conditions or restrictions are not satisfied, the server 120 can block authentication so that the access to the computing device 110 is not permitted.

At step (D), the server 120 transmits a verification response 104 to the computing device 110. If the server 120 has determined that the certificate 102 is a valid representation of a credential that has been designated for accessing the computing device 110, and the requirements of all appropriate policies are satisfied, the server 120 returns a positive verification response 104 which causes the computing device 110 to begin a boot process. For example, the verification response 104 can confirm that the certificate 102 and the underlying credential or authorization are valid and have not expired. The verification response 104 can also confirm that an authorization to access the OS of the computing device 110 is not presently restricted by an authentication policy of the certificate granting authority.

When verification is successful, the server 120 may take steps to initiate an authenticated session for the user 101 to access the computing device 110 and/or other resources. For example, the server may generate authentication data, such as a session identifier or session token, representing the new session and enabling the computing device 110 to access the session.

Access to the computing device 110 can be limited so that the credentials issued to only a few specific users are effective to obtain access. In other words, the credential can refer not merely to a certain type of authority (e.g., an employee credential in general), but instead a specific instance of a credential issued to a specific user (e.g., the employee credential issued specifically to employee Dave Smith).

If the server 120 fails to verify one of the various elements needed for verification, a negative verification result is returned. In this instance, the computing device 110 may either restrict the OS from booting on the computing device 110 or otherwise limit access to the computing device 110. For example, if the certificate 102 or the corresponding credential or authorization are not valid, authentication fails. Similarly, even if the certificate 102 validly represents a currently valid credential, a negative verification result can be provided if the credential does not carry authority for access of the specific computing device 110 being powered on or if the credential has been issued to a user that is not one of a specific set of users designated to access the computing device 110. As noted above, each credential can refer to a user-specific authorization, and so limiting access to a specific credential or credentials can limit access to a specific user or set of users.

At step (E), if the server 120 provides a positive verification response 104, the computing device 110 uses the verification response 104 to enable the OS to boot on the computing device 110. The computing device 110 then obtains authentication data 106 and provides it to OS boot manager 114 to log the user 101 into the OS without requiring further proof of identity, e.g., without requiring the user 101 to submit a username and password combination on an OS login screen. The network-based verification of the certificate 102 in the UEFI environment 116 is therefore used as a more secure substitute for typical proof of identity to log the user 101 into the OS of the computing device 110.

In some implementations, the authentication data 106 includes data from the server 120 provided with the verification response 104. For example, the computing device 110 can receive a session token in the verification response 104, and the UEFI environment 116 can pass the session token to the OS boot manager 114. As another example, the computing device 110 may receive proof of authentication under one or more authentication protocols, such as Kerberos, SAML, Windows Hello, OpenID, OpenID Connect, Active Directory, etc., which the OS is configured to accept for log in. As another example, the verification response 104 may include an encrypted password or other data to be passed to the OS to demonstrate proof of identity of the user 101 following a positive verification response 104.

In some implementations, some or all of the information provided to the OS boot manager 114 to enable boot is retrieved from storage in the TPM 112. For example, a login name and/or password for the user 101 may be stored in and retrieved from the TPM 112. In response to a verification response 104 that indicated successful verification, the TPM 112 may retrieve and provide log in data to the OS. In some implementations, the TPM 112 may not store all information needed to initiate boot with full access privileges, and may depend on information from the server 120 (e.g., a password, a Kerberos ticket, identification of an authenticated session, etc.) in part or in whole to enable the boot process.

As discussed above, because the TPM 112 operates in the UEFI environment 116, proof of identity of the user 101 is generated in the UEFI environment 116 prior to running the OS. As discussed below with respect to FIG. 3, the authenticated state (e.g., the established identity and authorization of the user 101) can be propagated to other applications that run in the UEFI environment 116 and/or applications running on the OS. This can automatically authenticate the user 101 for additional resources without requiring further proof of identity. Additionally, because certificate verification is a network-based operation performed by the server 120, the authentication can reflect the most up-to-date credential status and security policies and/or accurately reflect real-time adjustments to the authorizations of the user 101. For example, if the authorization of the user 101 has changed since the last user session, then the certificate verification procedure depicted in FIG. 1A would result in a negative verification result.

In some implementations, the system 100 utilizes the TPM 112 to perform additional procedures after receiving the verification response 104 but before providing the authentication data 106 to the OS boot manager 114. For example, the system 100 can use the TPM 112 to access a set of authorization policies 114A that specify conditions and/or restrictions associated with the authorizations of the user 101. The authorization policies 114A can include, for instance, conditional restrictions, such as usage-type restrictions or location restrictions that are associated with the authorizations of the user 101.

Based on the authorization policies 114A, the system 100 can use the TPM 112 to restrict access to the computing device 110 even if the verification response 104 indicates that the server 120 has verified the certificate 102 as being valid. As an example, if the user 101 is only permitted to access the computing device 110 during business hours, e.g., 9 AM to 5 PM on weekdays, then the computing device 110 may restrict the OS from booting if the user 101 attempts to access the computing device 110 on Saturday afternoon. In this example, even though the certificate 102 identifies that the user's authorization is presently valid, the TPM 112 is used to determine that an authorization policy is not satisfied and therefore does not enable the OS of the computing device 110 to boot.

As another example, the TPM 112 can be used to adjust the level of access to the OS of the computing device 110 based on conditions specified by the authorization policies 114A. For instance, if the computing device 110 does not presently have network connectivity and the certificate 102 is unable to be verified, the TPM 112 can be used to generate authentication data 106 that provides limited access to the OS, e.g., providing access to a limited number of applications, limiting or disabling network access through the OS, limiting which drives or partitions can be accessed, allowing a limited number of logins or a limited amount of time of use allowed, etc. For example, network-based login may be required for full access to the computing device 110 that accesses all data storage partitions and has network access. A failure to complete network-based login but successful verification of a PIN, password, or biometric input may allow for use of the computing device 110 in a limited mode in which network access is disabled and with access to one or more data storage partitions being blocked.

Once the user 101 is successfully authenticated in the UEFI environment 116, the computing device 110 can display a notification on its display screen to indicate to the user 101 that authentication has been achieved. The OS of the computing device 110 is then permitted to boot using the authentication data 106 without requiring the user 101 to provide log-in information. The authentication data 106 may provide information that identifies an authenticated session. For example, the server 120 may provide, with the verification response 104, data enabling the computing device 110 to access an authenticated session. To achieve this, the authentication data 106 may include, for example, a Kerberos ticket, an Open Authorization token, or a JSON Web Token (JWT), as well as other information such as a session identifier. In some instances, tokens for identity and authorization may be provided to and used by the computing device 110. In some implementations, the authentication data 106 may include other information for initiating a session of the OS, such as a login name and password, which may be provided in an encrypted form, and then be decrypted by the TPM 112.

The TPM 112 processes the received authentication data 106 and provides appropriate data to the OS boot manager 114 to enable to the OS to boot and log in the user 101 without further input from the user 101. For example, the transition from the UEFI environment 116 to the fully authenticated OS session can be performed on the basis of tokens, tickets, passwords, session identifiers, or other data provided by the TPM 112. Thus, the OS does not need to provide a lock screen or a log-in screen, or prompt the user for a password, biometric input, or other identifying data, before providing access based fully on the communication with the TPM 112.

Before exiting the UEFI environment 116, the TPM 112 may generate various other data connections or resources that are maintained in the handoff to the OS. For example, the TPM 112 may establish a VPN connection while running the UEFI environment 116, and may provide information to the OS boot manager 114 so that the VPN connection is maintained during and after OS boot. Thus, a secure network connection can be established and maintained before software, such as an OS, begins executing on the computing device 110. Access to other types of resources, such as certain drives or partitions, which may be encrypted or otherwise secured, can also be established and transferred to the OS. The TPM 112 can establish, maintain, and extend various types of access to resources, both local and remote, from the UEFI environment 116 to the OS environment.

As part of booting the OS, the computing device 110 can run the SSO agent 115. The SSO agent 115 can act to extend the authorization and authenticated status of the user 101 further to additional resources beyond the OS. For example, the SSO agent 115 can extend the access originally authorized by the TPM 112 in the UEFI environment 116 to third-party resources separate from the OS, such as local area network resources, wide area network resources, applications, services, and so on. To provide this access, the SSO agent 115 can store login data, e.g., usernames and passwords, for various resources. The SSO agent 115 can then use the stored information to provide access without require the user 101 to input any authentication information after the UEFI stage.

The system 100 can be configured for various different responses if the certificate 102 is not determined to be valid. In some implementations, a verification response 104 that is negative, or simply a failure to obtain a positive verification response 104 within a predetermined time, can prompt the TPM 112 to deny access to the computing device 110. The TPM 112 may continue to deny the ability for the OS to boot, and may initiate powering down of the computing device 110.

In some implementations, the computing device 110 may allow an alternative login procedure if network-based authentication fails or if network access is unavailable. For example, the user 101 may be requested to provide user identification information that allows the OS boot manager 114 to verify the user's proof of identity. For example, the user 101 may be requested to provide a username and password, a previously enrolled biometric, and/or a PIN number associated with his/her user identity that is then used to authenticate the user 101 into the OS. The information required in this mode may be more extensive than in the network-based authentication mode. In some implementations, the user 101 may be requested to provide previously enrolled user identification information from a verified device that is associated with a user identity of the user 101 to confirm his/her identity. For example, the user 101 may be requested to provide a QR code from a smartphone that is identified within the user identification data stored in the TPM 112 as being associated with the user 101. In other examples, a proximity of one or more trusted devices of the user 101, e.g., a smartphone that is registered to the user 101, can be determined using a wireless communication protocol, such as Bluetooth, in order to provide the user 101 with access to the computing device 110.

Although not depicted in FIG. 1A, in some instances, a similar technique of allowing login with alternative credentials (e.g., a multi-factor authentication different from the typical network-based login) can be used to allow the user 101 to access the computing device 110 for the first time during an initial login operation. In such instances, the computing device 110 is provided with initial user identification data using the provisioning technique depicted in FIG. 2. Once the user 101 powers on the computing device 110 for the first time, the computing device 110 establishes a connection to the server 120 over the network 105 and transmits the initial user identification data to the server 120. The server 120 verifies that the initial user identification data is valid.

During the initial login operation, the server 120 provisions the certificate 102 in a similar manner as discussed above in steps (B) through (D). The user 101 is then requested to provide user identification information, such as a username and password for logging onto the OS of the computing device 110, which is then included in the authentication data 106 and used to authenticate the user in subsequent user sessions. This information may be stored by the server 120 and provided at each login, or may be stored in the TPM 112. Alternatively, a username and password can be automatically generated for the user 101 based on the initial user identification data that has been verified by the server 120. In this regard, after the initial login operation, once the certificate 102 is determined to be valid, the username and password generated during the login operation can be retrieved from authentication data 106 and used to automatically authenticate the user 101 into the OS without requiring any additional proof of identification, as discussed above.

In some implementations, during the initial login operation, the user 101 can also be prompted to submit secondary user identification data, such as a specified PIN for authenticating the user identity of the user 101. For example, as discussed below with respect to FIG. 1B, in some implementations, the secondary user identification data can be used in subsequent login attempts as a secondary authentication check after verifying that the certificate 102 is valid and not expired as depicted in FIG. 1A.

Figure 1B:
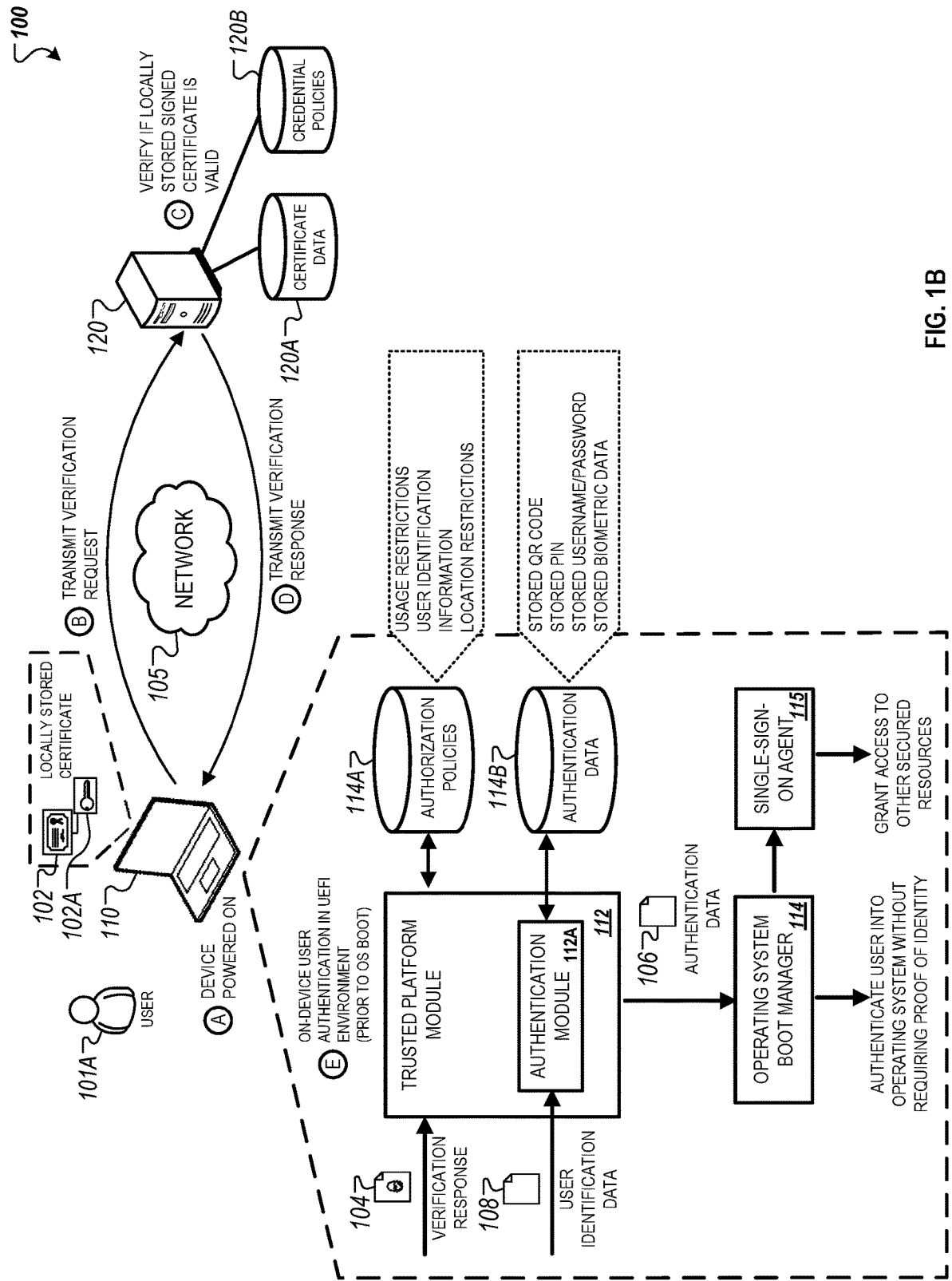

Referring now to FIG. 1B, the figure shows a block diagram that illustrates an example of a system for pre-boot network-based authentication. The example shows an authentication check after verifying the signed certificate 102 in the UEFI environment 116. The system 100 performs steps (A) through (D) in a similar manner as depicted in FIG. 1A. However, in the example depicted in FIG. 1B, the system 100 performs an additional authentication check at step (E) after verifying the certificate 102 as discussed above with respect to FIG. 1A. This additional authentication requirement may be due to instructions from the server 120, an indication of a risk level or other factor from the server 120, an updated policy for the computing device 110 or the credential of the user 101, or may be present in all instances.

As example depicted in FIG. 1B, the TPM 112 includes an authentication module 112A that receives user identification data 108 and verifies it against authentication data 114B. The user identification data 108 can be submitted by the user 101 in response to a prompt to provide additional proof of identity. For example, the authentication module 112A request the user 101 to provide the user identification data 108 after the verification response 104 has been received and indicates that certificate 102 is valid and not expired. In this example, the user identification data 108 can include information that the user 101 provides to further prove his/her user identity, such as a Quick Response (QR) code, a personal identifier number (PIN), or a biometric input, e.g., fingerprint, retinal scan, face scan, etc. The authentication module 112A compares the user identification data 108 to verified identification data stored within the authentication data 112A. The comparison is used to determine if the user identification data 108 is verified and represents a proof of identity. If the user identification data 108 is verified, the TPM 112 provides the authentication data 106 to the OS boot manager 114 to authenticate the user 101 in a similar manner as discussed above with respect to FIG. 1A.

In some implementations, the system 100 is capable of performing the operations discussed above in reference to FIGS. 1A and 1B in various types of pre-operating system environments that are designed to function in a similar manner as the UEFI environment 116 discussed above. In such implementations, the techniques discussed throughout this document, such as pre-boot authentication and device access control, can be provided in other software interfaces between an operating system and platform firmware. Examples of such pre-boot software interfaces include Pre-boot Execution Environment (PXE), Network Bootstrap Program (NBP), Programmable Logic Controller (PLC) operating systems and environment, Supervisory Control and Data Acquisition (SCADA) operating systems and environments, IoT Device Operating Environments, Automotive Operating Environments (e.g. SEK/VDX/AUTOSAR/QNX), among others. In some instances, the system 100 can be configured to perform the operations discussed above in other environments that are similar to UEFI, including manufacturer-specific environments. For example, the system 100 can be configured to operate in BIOS, coreboot, Windows PE (Microsoft), APFS Pre-boot (Apple), Latitude ON (Dell), Hyperspace (HP), OpenVMS (HP), Splashtop, Syslinux (PXELINUX), gPXE/iPXE, RedBoot, UBoot.

Figure 2:
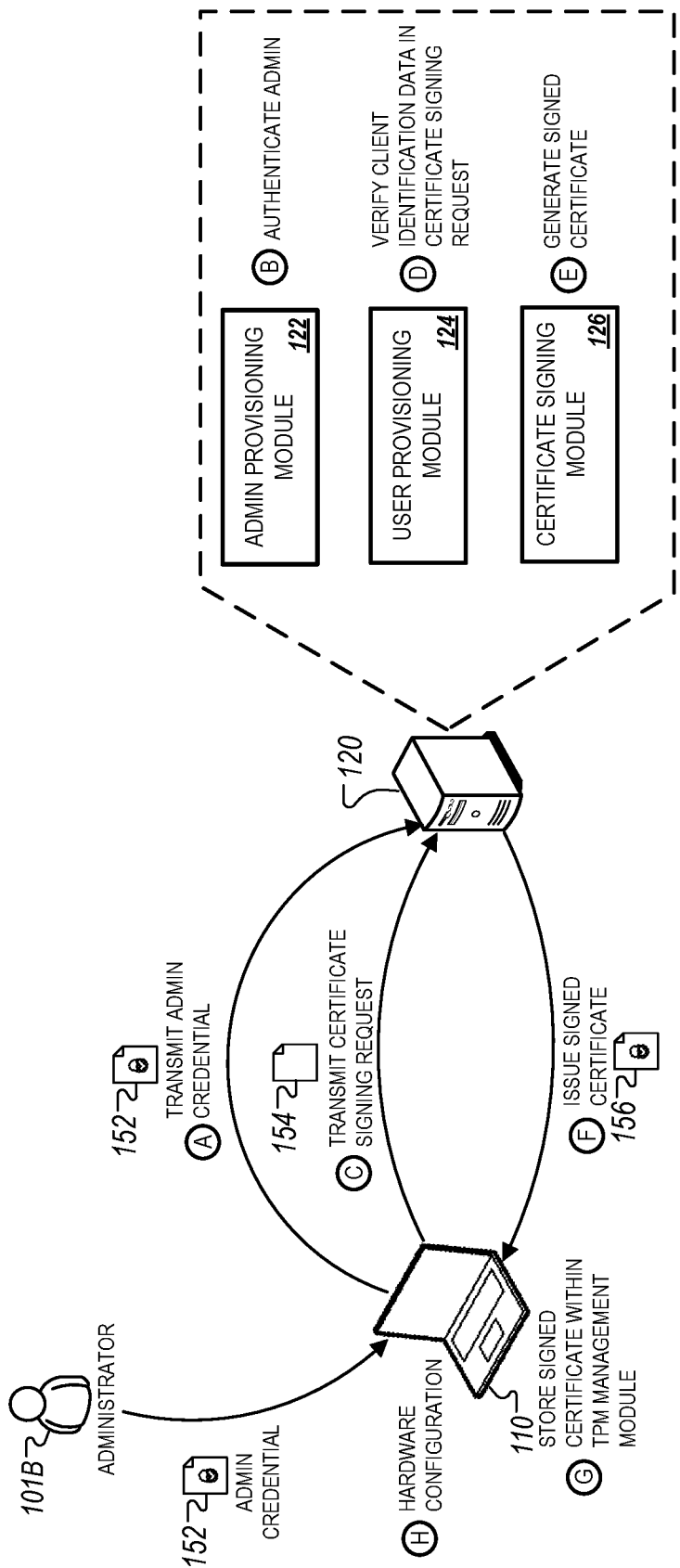
FIG. 2 is a block diagram that illustrates an example of configuring a computing device for pre-boot network-based authentication.

FIG. 2 illustrates an example of configuring a computing device 110 for pre-boot network-based authentication. This can be done prior to issuing the device to an associated user. The provisioned user identification data includes a signed certificate that can then be used in authenticating the user prior to booting an OS of the computing device 110, as depicted in FIGS. 1A and 1B. The user identification data can be provisioned by the certificate server, which includes an administrator provisioning module 122, a user provisioning module 124, and a certificate signing module 126.

The technique depicted in FIG. 2 is performed during an initial hardware configuration of the computing device 110 by an administrator 103. The administrator 103 can, for instance, be associated with a certificate granting authority prior to providing the computing device 110 to a user. For example, the administrator 103 can be an information technology specialist for an employer organization that sets up and configures company-issued computing devices to other employees of the employer organization. In this example, the technique depicted in FIG. 2 can be performed prior to issuing the computing device 110 to the employee. In other example, the administrator 103 may not be associated with the certificate granting authority but have access to the certificate granting authority and be authorized by the certificate granting authority to configure the computing device 110 to store certificates issued by the certificate granting authority.

The technique depicted in FIG. 2 proceeds as follows. At step (A), the administrator 103 submits an administrator credential 152 on an application running in the UEFI environment of the computing device 110, which is then transmitted to the server 120. At step (B), the server 120 authenticates the administrator credential 152 by verifying the administrator credential 152. At step (C), the computing device 110 transmits a certificate signing request 154 to the server 120. At step (D), the server 120 verifies user identification data for a user of the computing device 110 that is included in the certificate signing request 154. At steps (E) and (F), the server 120 generates a signed certificate 156 and issues the signed certificate 156 to the computing device 110. At step (G), the computing device 110 stores the signed certificate 156 issued by the server 120. At step (H), the computing device 110 is configured for a particular user that will be associated with the computing device 110.

In more detail, at step (A), the administrator 103 initially powers on the computing device 110 and submits the administrator credential 152 on an application that is pre-configured to run in the UEFI environment of the computing device 110. The application can be pre-configured into the UEFI environment by an OEM during manufacturing of the computing device 110. The computing device 110 establishes a connection with the server 120 and transmits the administrator credential 152 over the established connection. As examples, the administrator credential 152 can include a username and password, a QR code assigned to the administrator 103, a biometric input, or some other type of enrolled authentication data.

The administrator 103 can provide the administrator credential 152 directly into the computing device 110, or alternatively, through a paired device that is verified to be associated with the administrator 103. For example, the paired device can be a smartphone issued to the administrator 103 by the certificate granting authority 126, and the administrator credential 152 can be a QR code that is associated with the smartphone.

At step (B), an administrator provisioning module 122 of the server 120 verifies the administrator credential 152. The administrator provisioning module 122 can access an administrator repository that specifies a list of administrators and verified credentials assigned to each of the administrators. The administrator provisioning module 122 can use an administrator identifier associated with the administrator credential 152 to verify that it matches a stored administrator credential for the same administrator identified within the administrator repository. In the example discussed above where the administrator credential 152 is a QR code submitted through a smartphone of the administrator 103, the administrator provisioning module 122 can verify that the QR code matches a stored QR code and that a device identifier associated with the smartphone matches a stored device identifier associated with the administrator within the administrator repository. The administrator 103 is authenticated into the computing device 110 once the administrator credential 152 is verified by the administrator provisioning module 122.

At step (C), the computing device 110 transmits a certificate signing request 154 to the server 120. The certificate signing request 154 can include a device identifier of the computing device 110 and identification information for the user to be issued the computing device 110. For example, the identification information for the user can include an email address, a username, or a uniquely generated number for the user. The certificate signing request 154 also includes a public key associated with the computing device 110.

At step (D), the user provisioning module 124 of the server 120 validates the user identification data for a user of the computing device 110 that is included in the certificate signing request 154. The user provisioning module 124 generates authorizations for a user identity for a user of the identification data based on, for instance, specifications provided by certificate issuing authority. For example, as discussed above, the authorizations can include permission levels for accessing the applications that run on the computing device 110, restrictions associated with when the user can access the computing device 110, and/or conditions relating to permissions granted to the user. The user provisioning module 124 also verifies that the user identification data is authentic, e.g., that the identification data references a user that is actually supposed to receive access to the computing device 110. For example, in the employee-employer context, the user provisioning module 124 can access a list of known employees of the employer organization to determine whether the user referenced within the user identification data of the certificate signing request is an employee of the employer organization.

At steps (E) and (F), the certificate signing module 126 of the server 120 generates a signed certificate 156 and issues the signed certificate 156 to the computing device 110. The certificate signing module 126 can use any suitable cryptographic technique to generate a signed certificate 156 that is issued to the user identified within the certificate signing request 154. For example, the certificate signing module 126 can use an asymmetrical certificate signing process. The public key can be maintained on the server 120 and the private key 102A remains on the computing device 110. In other examples, the certificate signing module 126 can use other types of cryptographic techniques to generate the (signed) certificate 156. The (signed) certificate 156 is then provided to the computing device 110 and a copy is maintained on the server 120.

As discussed throughout, the signed certificate 156 can be used to represent authorizations that are provided to a particular user by the certificate granting authority. For example, a signed certificate 156 issued to an employee by an employer organization can represent, for instance, access privileges and permissions levels of the employee when accessing a company-issued computing device. In this example, the signed certificate 156 can be used to identify the employee and confirm that he/she is authorized to access the company-issued computing device.

The signed certificate 156 can also include key validation attributes that are used by the server 120 to validate the certificate when presented at a later point in time after the certificate is issued to the computing device 110, e.g., when the user powers on the computing device 110 and attempts to access the OS of the computing device 110. For example, as discussed above with respect to FIGS. 1A-1B, the signed certificate 156 can be included in a certificate verification request, and its key validation attributes can be evaluated by the server 120 to determine if the signed certificate 156 is still valid. In this example, if the key validation attributes of the signed certificate 156 no longer match the key validation attributes maintained by the server 120 e.g., the certificate issuing authority has changed the key validation attributes since the signed certificate 156 has been issued to the computing device 110, then the server 120 can determine that the signed certificate 156 is no longer valid and that the corresponding user authorizations have expired.

At step (G), the computing device 110 stores the signed certificate 156 issued by the server 120. For example, the computing device 110 can encrypt the signed certificate 156 using verified credential information that is received from the server 120. The encrypted certificate can then be stored in the TPM 112 that runs in the UEFI environment of the computing device 110. The TPM 112 can also store associated information, such as authorizations of the user corresponding to the signed certificate 156 and key validation attributes of the signed certificate 156.

Once TPM 112 stores the encrypted form of the signed certificate 156 and its associated information, the administrator 103 is automatically logged out of the computing device 110. The hardware configuration of the computing device 110 is complete and the computing device 110 can then be issued to a designated user (the user reference within the certificate signing request 154 and associated with the signed certificate 156).

Figure 3:
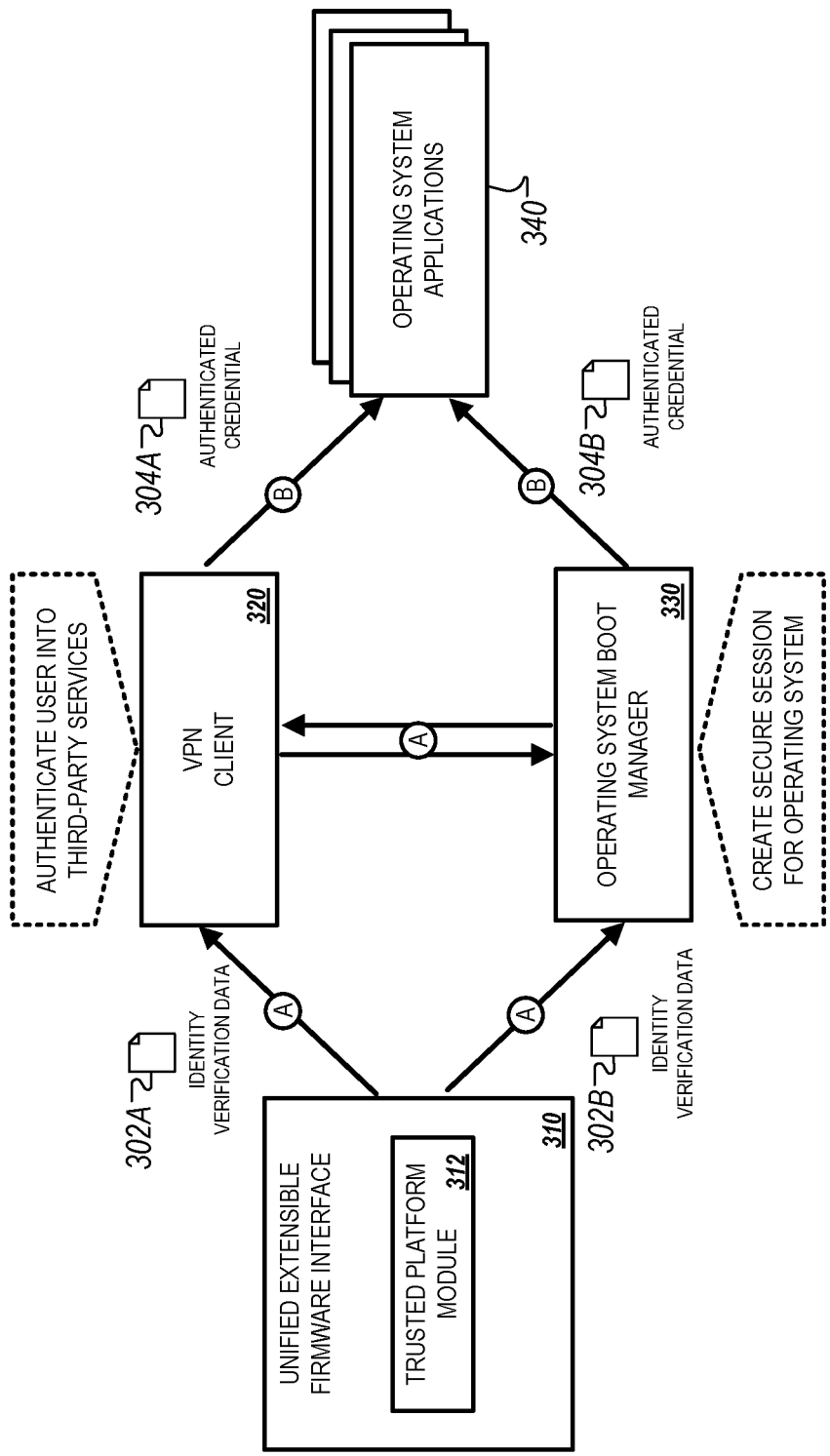
FIG. 3 illustrates an example of a technique for propagating an authenticated status from a UEFI environment to another software environment.

FIG. 3 illustrates an example of techniques for propagating authenticated status based on verifying a signed certificate in a UEFI environment prior to booting an OS of a computing device. As discussed above with respect to FIGS. 1A and 1B, a computing device can use verification of a signed certificate that is stored within a TPM as proof of identity of a user, which then allows the use of identity verification data stored in the TPM to authenticate the user without requiring input from the user after the UEFI stage.

In the example depicted in FIG. 3, a locally-stored signed certificate is verified in a UEFI environment 310 of a computing device similar techniques discussed above with respect to FIGS. 1A and 1B. Identity verification data stored in a TPM 312 that operates in the UEFI environment 310 can then be provided as proof of identity and/or authorization to other components that run in the UEFI environment 310 and/or components that run on the OS of the computing device. In this regard, the identity verification data can be used to provide proof of identity of a user prior to OS boot, which can then be used to generate an authenticated status 304B that can be propagated to both components running in the UEFI environment, as well as components running in the OS itself.

As shown in FIG. 3, the identity verification data can be provided to a virtual private network (VPN) client 320 associated with a third-party VPN service and an OS boot manager 330. In these examples, the identity verification data can be used as proof of identity to authenticate a user identity prior to booting the OS of the computing device and without requiring user input to provide proof of identity or authorization or to initiate the VPN connection.

In the first example, identity verification data 302A can include a user's credentials for authenticating into the VPN client 320 that is managed by a third-party VPN service provider. In this example, a TPM 314 running in the UEFI environment 310 obtains the user's VPN credentials to automatically authenticate the user into a secure VPN session. The TPM 314 can use the identity verification data 302A to automatically populate a VPN credentials (e.g. username and password, SSL client certificate, etc.) and log the user into a VPN network, which then allows the computing device to establish communications with the VPN client 320.

Once the secure VPN session is established, the TPM 314 can provide the session information to the OS, which can access the session. The authenticated status 304A, representing the successful VPN login, may be propagated to log in the user 101 other applications 340 that are initialized after the OS is booted. For example, the authenticated status 304A can be propagated to an application that runs on the OS. The user can remain logged into a VPN session that is initiated in the UEFI environment and persists during and after the OS is booted without requiring the user to re-submit the VPN username and password once the VPN application is initialized.

In the second example, identity verification data 302B can include a user's login credentials for the OS and other applications that run on the OS. In this example, the TPM 314 initially obtains the user's OS login information to automatically authenticate the user into the OS boot manager 330. The TPM 314 can use the identity verification data 302B to automatically populate an OS username and password and log in the user to a secure session for the OS booted by the OS boot manager.

Once the OS is booted, the TPM 314 can provide an authenticated status 304B that extends to OS applications 340 that are initialized after the OS is booted. This may facilitated by additional communication with a server, and/or by a SSO agent running on the computing device. For example, the authenticated status 304B can cause an application password to be retrieved, in order to authenticate the user into a user account for a web browser application running on the OS. In this example, the authenticated status 304B can be propagated to the web browser application to automatically log into the user account without requiring the user to submit the application password.

In some instances, the TPM 314 can provide identity verification data to multiple components in order to authenticate the user in parallel into multiple application services prior to booting the OS of the computing system. For example, the identity verification data can initially be provided to the VPN client 320 to authenticate the user into a third-party VPN service, and then provided to the OS boot manager 330 to create a secure session for the OS. In another example, the identity verification data 302 can instead be initially be provided to the OS boot manager 330 to create a secure session for the OS, and then provided VPN client 320 to authenticate the user into third-party services. In yet another example, the identity verification data can be provided to the VPN client 320 and the OS boot manager 330 in parallel to allow the user to be authenticated into a third-party VPN service simultaneously with creating a secure session for the OS of the computing device.

Figure 4:
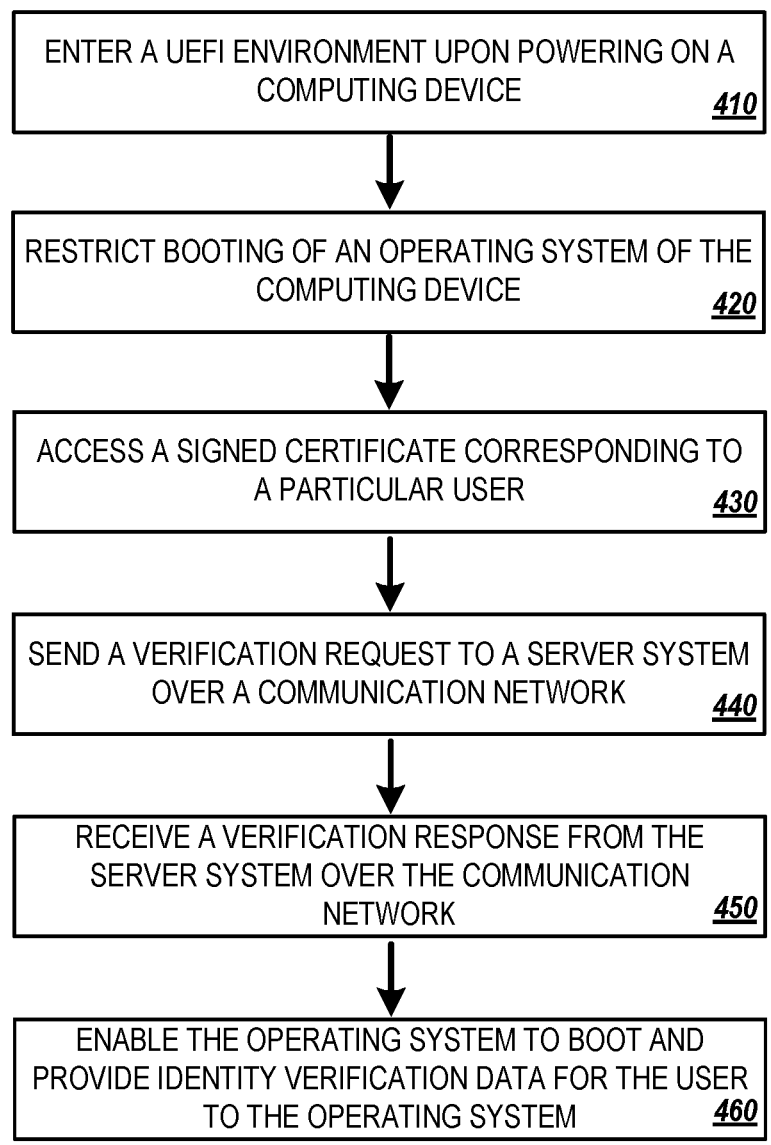
FIG. 4 is a flow diagram that illustrates an example of a process for pre-boot network-based authentication.

FIG. 4 illustrates an example of a process 400 for verifying a signed certificate in a UEFI environment prior to booting an operating system on a computing device. Briefly, the process 400 can include the operations of entering a UEFI environment upon powering on a computing device (410), restricting booting of an operating system of the computing device (420), accessing a signed certificate corresponding to a particular user (430), sending a verification request to a server system over a communication network (440), receiving a verification response from the server system over the communication network (450), and enabling the operating system to boot and provide identity verification data for the user to the operating system (460).

In more detail, the process 400 can include the operation of entering a UEFI environment upon powering on a computing device (410). For example, the computing device 110 can enter a UEFI environment upon being powered on by the user 101. As discussed above, the UEFI environment can represent a software interface between an operating system and platform software of the computing device. In some implementations, UEFI firmware can provide legacy support for BIOS services and can support remote diagnostics and/or repair without the requirement to have an operating system installed on the computing device 110. Further, the UEFI environment can provide boot and runtime services that are available to the OS boot manager 114 and the OS of the computing device 110.

The process 400 can include the operation of restricting booting of an operating system of the computing device (420). For example, while in the UEFI environment, the computing device 110 can restrict booting of the OS of the computing device 110. As discussed above, this restriction can be placed by the TPM 112 that operates within the UEFI environment of the computing device 110. The TPM 112 can access and/or store authorization policies 114A that are used to determine whether to permit booting of the OS based on certain restrictions, such as usage restrictions and location restrictions, or conditions associated with the authorization of the user 101.

As discussed above, the OS can be permitted to boot once the signed certificate 102 that is locally stored within the TPM 112 has been verified by the server 120 as being valid and not expired. In some instances, the computing device 110 can restrict booting if the signed certificate 102 is determined to not be valid, is expired, or alternatively, if one or more present conditions do not satisfy the authorization policies 114A. For example, the computing device 110 can restrict booting the OS if the certificate 102 is determined to be valid and not expired but if the user 101 is attempted to access the computing device 110 during a time period that the authorization policies 114A specify that the user 101 does not have authorization to access the computing device 110. As another example, the computing device 110 can restrict booting the OS if the certificate 102 is determined to be valid and not expired but that the user 101 is attempted to access the computing device 110 in a location that is not authorized for use within the authorization policies 114A.

The process 400 can include the operation of accessing a signed certificate corresponding to a particular user (430). For example, the computing device 110 can access the certificate 102 that is stored in the TPM 112. As discussed above, the certificate 102 can correspond to the user 101 and can be provisioned to the computing device 110 by the server 120 prior to the computing device 110 being powered on in step 410.

For example, as discussed above with respect to FIG. 2, the certificate 102 can be provisioned to the computing device 110 during an initial hardware configuration of the computing device 110 by the administrator 103. As another example, the certificate 102 may have been provisioned to the computing device 110 during a prior user session when the user 101 previously access the computing device 110. In this example, the certificate 102 can be generated and issued based on a previously issued certificate that was used to access the computing device 110 during the prior session. In this regard, the certificate 102 can be periodically updated and/or replaced by the server 120 each time the user 101 access the computing device 110 and each time a locally stored certificate is used to verify a user identity in relation to accessing the computing device 110. In some implementations, the certificate 102 is used a one-time token that is issued by the server 120 and used to verify the user identity of the user 101 during a single instance before expiration. In some instances, the certificate 102 can be time-dependable and periodically updated by the server 120 across multiple user sessions on the computing device 110.

The process 400 can include the operation of sending a verification request to a server system over a communication network (440). For example, the computing device 110 can send the verification request to the server 120 over the network 105. The verification request can be generated based on the certificate 102 and can include user identification data that is stored in the TPM 112.

As discussed above, the server 120 receives the verification request and verifies the certificate 102 to determine if it is valid based on the certificate data 120A. For example, the server 120 can compare key validation attributes of the certificate 102 to validation attributes identified within the certificate data 120A to confirm whether the certificate 102 is still valid and unexpired.

In some instances, if the certificate granting authority has adjusted the key validation attributes of the certificate 102 since it has last been used for verification, then the changes can be reflected in the certificate data 120A and used by the server 120 to determine that the certificate 102 has become invalid and/or has expired. In such instances, the user 101 can be requested to submit user identification data to provide proof of identity. If the submitted user identification data is verified, then the server 120 can provision a new signed certificate to the computing device 110, which is then stored in the TPM 112 and used for verification during a subsequent certificate verification process. In other instances, the server 120 can determine that the certificate 102 has become expired based on an expiration data specified for the certificate 102 within the certificate data 120A. In such instances, the server 120 may require the user 101 to similarly provide user identification data to establish proof of identity, and in response to verifying the user's proof of identity, issue a new certificate to the computing device 110.

The authentication server 120 generates the verification response 104 that indicates whether the signed certificate 102 is verified or not. As discussed above, if the server 120 determines that the certificate 102 is valid and not expired, then the verification response 104 can be used to confirm the authorization of the user 101 corresponding to the certificate 102. The verification response 104 is provided to the computing device 110 over the network 105 and used to generate the authentication data 106.

In some implementations, the TPM 112 stores a secure address for the server 120. In such implementations, the computing device 110 determines an address to send the verification request based on the secure address of the server 120 stored in the TPM 112. The computing device 110 then sends the verification request to the secure address for the server 120. The secure address can be a URL of the server 120, an IP address of the server 120, or any other type of web address that allows transmission of data to a specified network address over a communication network. In some instances, the secure address of the server 120 can be used to provide out-of-band authentication, or user authentication over a network or channel separate from the primary network or channel of the computing device 110.

The process 400 can include the operation of receiving a verification response from the server system over the communication network (450). For example, the computing device 110 can receive the verification response 104 from the authentication server 120 over the network 105. If the verification response 104 indicates that the certificate is valid and not expired, then the verification response 104 can be used by the TPM 112 to confirm authorization of the user 101 and automatically authenticate the user based on identity verification data stored in the TPM 112.

In some implementations, the TPM 112 can further evaluate the authorization of the user 101 even if the verification response 104 indicates that the certificate 102 is valid. For example, the TPM 112 can evaluate the authorization based on the authorization policies 114A. As discussed above, the authorization policies 114A can specify time-dependent and/or context-dependent factors are used by the TPM 112 to determine the authorization of the user 101 to access the OS of the computing device 110.

As an example, the authorization of the user 101 can be verified based on usage restrictions specified within the authorization policies 114A. In this example, if the computing device 110 is turned on at a time when device access is not permitted within the authorization policies 114A, e.g., outside business hours, then the TPM 112 determines that the user 101 is not authorized to access the computing device 110 even though the certificate 102 is determined by the server 120 to be valid and unexpired. Alternatively, if the computing device 110 is turned on at a time when device access is permitted, e.g., during business hours, then the TPM 112 determines that the user 101 is authorized to access the computing device 110.

The process 400 can include the operation of enabling the operating system to boot and provide identity verification data for the user to the operating system (460). For example, in response to receiving the verification response 104 that confirms the authorization of the user 101, the TPM 112 enables the OS boot manager 114 to boot the OS of the computing device 110. The TPM 112 also provides the authentication data 106 to the OS boot manager 114 to log the user 101 into the OS without requiring the user to provide proof of identity. As discussed above, the authentication data 106 can include a proof of identity for the user 101 that was previously verified during a prior log-in operation, e.g., when the user 101 first logged into the computing device 110 after being issued the computing device 110. In this regard, the verification of the certificate 102 itself can be used as proof of identity of the user 101 and not require the user 101 to provide any further proof of identity.

Additionally, the authentication data 106 can be used to propagate proof of identity of the user 101 as a means of authenticating a user identity. In some instances, the authentication data 106 can be used to authenticate the user identity in the UEFI environment prior to booting the OS. For example, the authentication data 106 can be used to automatically enter a VPN session before OS boot. In this example, the computing device 110 enters the virtual private network session using user identification information contained within the authentication data 106 and based on the verification response 104 confirming authorization for the user 101 to enter the VPN session. The computing device 110 can then pass the virtual private network session to the OS boot manager 114 such that the OS continues the VPN session after the OS is enabled to boot. In this regard, the user identity of the user 101 is authenticated into the VPN session in the UEFI environment (i.e., prior to OS boot), and the authentication data 106 is used to propagate a verified user identity to the OS so that the user 101 does not need to submit and/or re-enter proof of identity after the OS boots.

In other instances, the authentication data 106 can be used to authenticate the user identity after the OS boots. For instance, the authentication data 106 can be provided to application running on the OS to authenticate the user identity without requiring the user to provide proof of identity. As an example, the authentication data 106 can be provided to a web browser application to allow the web browser application to provide a single sign-on authentication service that authenticates the user identity of the user 101 based on the user identification information contained within the authentication data 106. In this regard, certificate verification in the pre-OS boot UEFI environment can be used to authenticate a user identity even after the OS is booted on the computing device 110.

In the examples discussed above, the verification of a locally stored certificate 102 can be used to establish a proof of identity for authentication of a user identity. However, in some implementations, the computing device 110 can perform additional user identity verification even after receiving a verification response from the server 120 indicating that the locally stored certificate 102 is valid and not expired. As depicted in FIG. 1B, in such implementations, the TPM 112 includes the authentication module 112A for verifying user identification data 108 submitted by the user 101 after receiving the verification response 104. In such implementations, the user identification data 108 can represent, for example, a PIN code provided by the user 101 and compared against a previously enrolled PIN code stored within the authentication data 114B. In other examples, the user identification data 108 can include an alphanumeric password, a biometric input, or some other type of enrolled authentication data.

Embodiments of the subject matter and all of the functional operations described in this specification may be implemented in digital electronic circuitry, or in computer software, firmware, or hardware, including the structures disclosed in this specification and their structural equivalents, or in combinations of one or more of them. Embodiments of the subject matter may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the subject matter or of what may be claimed, but rather as descriptions of features specific to particular embodiments of the subject matter. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the subject matter have been described. Other embodiments are within the scope of the following claims. For example, the actions recited in the claims may be performed in a different order and still achieve desirable results.

What is claimed is:

1. A method comprising:
entering, by a computing device, a Unified Extensible Firmware Interface (UEFI) environment upon powering on the computing device;
while in the UEFI environment:
restricting, by the computing device, booting of an operating system of the computing device;
accessing, by the computing device and from a trusted platform module of the computing device, a certificate corresponding to a particular user;
sending, by the computing device, a verification request to a server system over a communication network, the verification request being generated based on the certificate; and
receiving, by the computing device, a verification response from the server system over the communication network, the verification response confirming authorization for the particular user corresponding to the certificate; and
in response to receiving the verification response:
initiating, by the computing device, a communication session based on confirming authorization for the particular user,
enabling, by the computing device, the operating system to boot, and
passing, by the computing device, the communication session to the operating system such that the operating system continues the communication session after the operating system is enabled to boot.

2. The method of claim 1, wherein:
the trusted platform module stores a secure address for the server system; and
sending the verification request to the server system comprises:
determining an address to send the verification request based on the secure address stored in the trusted platform module, and
sending the verification request to the secure address for the server system.

3. The method of claim 1, while in the UEFI environment, the method further comprises:
initiating the communication session by entering a virtual private network session; and
passing the communication session to the operating system by passing the virtual private network session to the operating system such that the operating system continues the virtual private network session after the operating system is enabled to boot.

4. The method of claim 1, further comprising:
receiving, by the computing device, a proof of identity of the particular user;
verifying the proof of identity of the particular user; and
enabling the operating system to boot based on verifying the proof of identity of the particular user.

5. The method of claim 4, wherein verifying the proof of identity of the particular user comprises verifying at least one of:

a personal identification number (PIN) provided by the particular user;
a username and password combination provided by the particular user;
biometric data of the particular user; or
proximity of one or more trusted devices of the particular user.

6. The method of claim 1, wherein the verification response indicates that (i) an authorization issued to a user is valid and has not expired, and (ii) use of the authorization is not presently restricted by an authorization policy.

7. The method of claim 6, wherein the authorization policy specifies a particular time frame during which use of the authorization is restricted.

8. The method of claim 6, wherein:
the method further comprises obtaining, by the computing device, context data associated with the computing device upon powering on the computing device; and
the verification response confirms that the context data associated with the computing device satisfies the authorization policy.

9. The method of claim 1, wherein:
while in the UEFI environment, the method further comprises:
determining, by the computing device, that the computing device is unable to connect to the communication network;
in response to determining that the computing device is unable to connect to the communication network, accessing by the computing device and from the trusted platform module, a limited certificate corresponding to the particular user; and
enabling, by the computing device, the operating system to boot in a limited configuration such that the operating system restricts network access on the computing device after the operating system logs in the particular user.

10. The method of claim 9, further comprising:
after enabling the operating system to boot in the limited configuration, providing, by the computing device, identify verification data specifying the limited certificate to one or more applications running on the operating system such that one or more applications logs in the particular user without requiring proof of identity.

11. The method of claim 1, wherein the verification request comprises at least a device identifier of the computing device stored within the trusted platform module and a user identifier for with the particular user.

12. A system comprising:
one or more computers; and
one or more storage devices storing instructions that, when executed by the one or more computers, cause the one or more computers to perform operations comprising:
entering, by a computing device, a Unified Extensible Firmware Interface (UEFI) environment upon powering on the computing device;
while in the UEFI environment:
restricting, by the computing device, booting of an operating system of the computing device;
accessing, by the computing device and from a trusted platform module of the computing device, a certificate corresponding to a particular user;
sending, by the computing device, a verification request to a server system over a communication network, the verification request being generated based on the certificate; and receiving, by the computing device, a verification response from the server system over the communication network, the verification response confirming authorization for the particular user corresponding to the certificate; and in response to receiving the verification response:
: initiating, by the computing device, a communication session based on confirming authorization for the particular user, enabling, by the computing device, the operating system to boot, and passing, by the computing device, the communication session to the operating system such that the operating system continues the communication session after the operating system is enabled to boot.

13. The system of claim 12, wherein:
the trusted platform module stores a secure address for the server system; and
sending the verification request to the server system comprises:
: determining an address to send the verification request based on the secure address stored in the trusted platform module, and
sending the verification request to the secure address for the server system.

14. The system of claim 12, wherein, while in the UEFI environment, the operations further comprise:
initiating the communication session by entering a virtual private network session; and
passing the communication session to the operating system by passing the virtual private network session to the operating system such that the operating system continues the virtual private network session after the operating system is enabled to boot.

15. The system of claim 12, wherein the operations further comprise:
receiving, by the computing device, a proof of identity of the particular user;
verifying the proof of identity of the particular user; and
enabling the operating system to boot based on verifying the proof of identity of the particular user.

16. One or more non-transitory computer-readable storage devices encoded with computer program instructions that, when executed by one or more computers, cause the one or more computers to perform operations comprising:
entering, by a computing device, a Unified Extensible Firmware Interface (UEFI) environment upon powering on the computing device;
while in the UEFI environment:
: restricting, by the computing device, booting of an operating system of the computing device;
accessing, by the computing device and from a trusted platform module of the computing device, a certificate corresponding to a particular user;
sending, by the computing device, a verification request to a server system over a communication network, the verification request being generated based on the certificate; and
receiving, by the computing device, a verification response from the server system over the communication network, the verification response confirming authorization for the particular user corresponding to the certificate; and in response to receiving the verification response:
: initiating, by the computing device, a communication session based on confirming authorization for the particular user,
enabling, by the computing device, the operating system to boot, and
passing, by the computing device, the communication session to the operating system such that the operating system continues the communication session after the operating system is enabled to boot.

17. The one or more non-transitory computer-readable storage devices of claim 16, wherein:
the trusted platform module stores a secure address for the server system; and
sending the verification request to the server system comprises:
: determining an address to send the verification request based on the secure address stored in the trusted platform module, and
sending the verification request to the secure address for the server system.

18. The one or more non-transitory computer-readable storage devices of claim 16, wherein, while in the UEFI environment, the operations further comprise:
initiating the communication session by entering a virtual private network session; and
passing the communication session to the operating system by passing the virtual private network session to the operating system such that the operating system continues the virtual private network session after the operating system is enabled to boot.

19. The one or more non-transitory computer-readable storage devices of claim 16, wherein the operations further comprise:
receiving, by the computing device, a proof of identity of the particular user;
verifying the proof of identity of the particular user; and
enabling the operating system to boot based on verifying the proof of identity of the particular user.

20. The method of claim 1, further comprising, in response to receiving the verification response, providing, by the computing device, identity verification data for the particular user to the operating system such that the operating system logs in the particular user without requiring further proof of identity for the particular user.

* * * * *